United States Patent
Jiang et al.

(10) Patent No.: US 6,840,686 B2
(45) Date of Patent: Jan. 11, 2005

(54) METHOD AND APPARATUS FOR VERTICAL BOARD CONSTRUCTION OF FIBER OPTIC TRANSMITTERS, RECEIVERS AND TRANSCEIVERS

(75) Inventors: Wenbin Jiang, Calabasas, CA (US); Cheng Ping Wei, Gilbert, AZ (US)

(73) Assignee: JDS Uniphase Corporation, San Jose, CA (US)

( * ) Notice: Subject to any disclaimer, the term of this patent is extended or adjusted under 35 U.S.C. 154(b) by 1 day.

(21) Appl. No.: 09/745,033

(22) Filed: Dec. 20, 2000

(65) Prior Publication Data

US 2002/0076173 A1 Jun. 20, 2002

Related U.S. Application Data

(63) Continuation of application No. 09/320,409, filed on May 26, 1999, now Pat. No. 6,213,651.

(51) Int. Cl.$^7$ ................................................ G02B 6/42
(52) U.S. Cl. ........................................................ 385/92
(58) Field of Search ...................................... 385/88–94

(56) References Cited

U.S. PATENT DOCUMENTS

| | | |
|---|---|---|
| 2,949,595 A | 8/1960 | Doeleman |
| 3,335,387 A | 8/1967 | Mueller |
| 3,385,970 A | 5/1968 | Coffin, Jr. et al. |
| 3,395,331 A | 7/1968 | Snitzer |
| 3,423,594 A | 1/1969 | Galopin |
| 3,492,058 A | 1/1970 | Waldman |
| 3,564,231 A | 2/1971 | Bruce |
| 3,582,637 A | 6/1971 | Cecil, Jr. |
| 3,624,385 A | 11/1971 | Wall |
| 3,628,036 A | 12/1971 | Humphrey |
| 3,663,822 A | 5/1972 | Uchida |
| 3,712,984 A | 1/1973 | Lienhard |

(List continued on next page.)

FOREIGN PATENT DOCUMENTS

| | | |
|---|---|---|
| EP | 0 448 989 A1 | 10/1991 |
| EP | 0 652 696 A1 | 11/1994 |
| JP | 1098299 | 4/1989 |
| JP | 8194129 | 7/1996 |
| JP | 8248277 | 9/1996 |
| JP | 8-321627 A | 12/1996 |
| JP | 9171127 | 6/1997 |
| WO | WO 99/54772 | 10/1999 |

OTHER PUBLICATIONS

A. Mickelson, N. Basavanhally & Yung–Cheng Lee; Opto–electronic Packaging; 1997; pp. 79–101 & 231–250; John Wiley & Sons, Inc. New York, NY.

Erik Van Der Bij; Optical Link Cards (OLC) & Gigabaud Link Modules (GLM); Jan. 7, 1998; http://hsi.web.cern.ch/HSI/fcs/comps/olcglm.htm.

S. Sasaki, N. Tanaka, Y. Ando & S. Yamaguchi, A Compact Optical Active Connector: An Optical Interconnect Module with an Electrical Connector Interface, IEEE Transactions on Advanced Packaging, vol. 22, No. 4 11/99.

(List continued on next page.)

*Primary Examiner*—Rodney Bovernick
*Assistant Examiner*—Mike Stahl
(74) *Attorney, Agent, or Firm*—Allen, Dyer, Doppelt, Milbrath & Gilchrist, P.A.

(57) ABSTRACT

Fiber optic transmitter and receiver electrical elements are implemented on separate vertical boards in fiber optic modules. A single optical block implements lenses and reflecting surfaces to minimize manufacturing costs. In one embodiment the receiver and transmitter are mounted to receive and transmit vertical boards respectively to nearly face each other but being offset to avoid optical cross talk. In a second embodiment, receiver and transmitter are mounted parallel with the printed circuit boards to save additional space. The vertical boards have ground planes to minimize electrical cross talk. A shielded housing provides further shielding for EMI. Manufacturing steps of the fiber optic transceiver are disclosed which provide reduced manufacturing costs.

25 Claims, 12 Drawing Sheets

U.S. PATENT DOCUMENTS

| | | |
|---|---|---|
| 3,721,815 A | 3/1973 | Wall |
| 3,724,383 A | 4/1973 | Gallaghan et al. |
| 3,756,688 A | 9/1973 | Hudson et al. |
| 3,758,784 A | 9/1973 | Vischulis |
| 3,780,295 A | 12/1973 | Kapron et al. |
| 3,790,791 A | 2/1974 | Anderson |
| 3,792,208 A | 2/1974 | Meyer |
| 3,792,284 A | 2/1974 | Kaelin |
| 3,800,388 A | 4/1974 | Borner et al. |
| 3,803,409 A | 4/1974 | Prochazka |
| 3,803,511 A | 4/1974 | Thompson |
| 3,808,549 A | 4/1974 | Maurer |
| 3,809,908 A | 5/1974 | Clanton |
| 3,814,933 A | 6/1974 | Weber |
| 3,842,257 A | 10/1974 | Kohler |
| 3,842,262 A | 10/1974 | Heitman et al. |
| 3,859,536 A | 1/1975 | Thiel |
| 3,864,016 A | 2/1975 | Dakss et al. |
| 3,870,396 A | 3/1975 | Racki et al. |
| 3,878,397 A | 4/1975 | Robb et al. |
| 3,887,803 A | 6/1975 | Savage, Jr. |
| 3,892,962 A | 7/1975 | Whited |
| 3,894,789 A | 7/1975 | Kobayashi et al. |
| 3,896,305 A | 7/1975 | Ostrowsky et al. |
| 3,932,761 A | 1/1976 | Ramsey et al. |
| 3,950,075 A | 4/1976 | Cook et al. |
| 3,963,920 A | 6/1976 | Palmer |
| 3,968,564 A | 7/1976 | Springthorpe |
| 3,976,877 A | 8/1976 | Thillays |
| 3,995,935 A | 12/1976 | McCartney |
| 4,007,978 A | 2/1977 | Holton |
| 4,030,811 A | 6/1977 | Khoe et al. |
| 4,045,120 A | 8/1977 | de Corlieu et al. |
| 4,056,299 A | 11/1977 | Paige |
| 4,060,309 A | 11/1977 | Le Noane et al. |
| 4,065,203 A | 12/1977 | Goell et al. |
| 4,075,477 A | 2/1978 | Hanson |
| 4,076,376 A | 2/1978 | Slaughter |
| 4,102,559 A | 7/1978 | Hunzinger |
| 4,118,100 A | 10/1978 | Goell et al. |
| 4,119,362 A | 10/1978 | Holzman |
| 4,130,343 A | 12/1978 | Miller et al. |
| 4,136,357 A | 1/1979 | Frederiksen |
| 4,144,541 A | 3/1979 | Schaefer et al. |
| 4,149,072 A | 4/1979 | Smith et al. |
| 4,156,206 A | 5/1979 | Comerford et al. |
| 4,161,650 A | 7/1979 | Caouette et al. |
| 4,166,668 A | 9/1979 | MacLeod |
| 4,167,303 A | 9/1979 | Bowen et al. |
| 4,168,883 A | 9/1979 | MacLeod |
| 4,169,656 A | 10/1979 | Hodge |
| 4,170,399 A | 10/1979 | Hansen et al. |
| 4,179,801 A | 12/1979 | Hollis |
| 4,181,401 A | 1/1980 | Jensen |
| 4,182,545 A | 1/1980 | Greer |
| 4,184,741 A | 1/1980 | Hawk et al. |
| 4,186,994 A | 2/1980 | Denken et al. |
| 4,186,995 A | 2/1980 | Schumacher |
| 4,190,767 A | 2/1980 | Crouse |
| 4,199,222 A | 4/1980 | Ikushima et al. |
| 4,204,743 A | 5/1980 | Etaix |
| 4,237,474 A | 12/1980 | Ladany |
| 4,252,402 A | 2/1981 | Puech et al. |
| 4,257,672 A | 3/1981 | Balliet |
| 4,268,114 A | 5/1981 | d'Auria et al. |
| 4,268,115 A | 5/1981 | Slemon et al. |
| 4,268,756 A | 5/1981 | Crouse et al. |
| 4,270,134 A | 5/1981 | Takeda et al. |
| 4,273,413 A | 6/1981 | Bendikens et al. |
| 4,276,656 A | 6/1981 | Petryk, Jr. |
| 4,281,891 A | 8/1981 | Shinohara et al. |
| 4,285,572 A | 8/1981 | Beaudette et al. |
| 4,297,651 A | 10/1981 | Dyment et al. |
| 4,302,070 A | 11/1981 | Nakayama et al. |
| 4,307,934 A | 12/1981 | Palmer |
| 4,311,359 A | 1/1982 | Keller |
| 4,326,771 A | 4/1982 | Henry et al. |
| 4,330,172 A | 5/1982 | Monaghan et al. |
| 4,347,655 A | 9/1982 | Zory et al. |
| 4,355,323 A | 10/1982 | Kock |
| 4,357,072 A | 11/1982 | Goodfellow et al. |
| 4,362,360 A | 12/1982 | Mannschke |
| 4,378,954 A | 4/1983 | Baker |
| 4,383,731 A | 5/1983 | Simon et al. |
| 4,384,368 A | 5/1983 | Rosenfeldt et al. |
| 4,387,956 A | 6/1983 | Cline |
| 4,394,061 A | 7/1983 | Schroeder |
| 4,399,453 A | 8/1983 | Berg et al. |
| 4,399,487 A | 8/1983 | Neumann |
| 4,399,541 A | 8/1983 | Kovats et al. |
| 4,406,514 A | 9/1983 | Hillegonds et al. |
| 4,408,353 A | 10/1983 | Bowen et al. |
| 4,410,469 A | 10/1983 | Katagiri et al. |
| 4,418,983 A | 12/1983 | Bowen et al. |
| 4,427,879 A | 1/1984 | Becher et al. |
| 4,431,261 A | 2/1984 | Kozikowski |
| 4,432,604 A | 2/1984 | Schwab |
| 4,435,037 A | 3/1984 | Abramson et al. |
| 4,439,006 A | 3/1984 | Stevenson |
| 4,446,515 A | 5/1984 | Sauer et al. |
| 4,449,244 A | 5/1984 | Kopainsky |
| 4,456,334 A | 6/1984 | Henry et al. |
| 4,461,537 A | 7/1984 | Raymer, II et al. |
| 4,465,333 A | 8/1984 | Caserta et al. |
| 4,470,660 A | 9/1984 | Hillegonds et al. |
| 4,471,414 A | 9/1984 | Savage, Jr. |
| 4,479,696 A | 10/1984 | Lubin et al. |
| 4,479,698 A | 10/1984 | Landis et al. |
| 4,485,474 A | 11/1984 | Osterwalder |
| 4,491,900 A | 1/1985 | Savage, Jr. |
| 4,491,981 A | 1/1985 | Weller et al. |
| 4,493,113 A | 1/1985 | Forrest et al. |
| 4,523,802 A | 6/1985 | Sakaguchi et al. |
| 4,527,285 A | 7/1985 | Kekas et al. |
| 4,530,566 A | 7/1985 | Smith et al. |
| 4,533,209 A | 8/1985 | Segerson et al. |
| 4,534,616 A | 8/1985 | Bowen et al. |
| 4,535,233 A | 8/1985 | Abraham |
| 4,539,476 A | 9/1985 | Donuma et al. |
| 4,542,076 A | 9/1985 | Bednarz et al. |
| 4,549,782 A | 10/1985 | Miller |
| 4,549,783 A | 10/1985 | Schmachtenberg, III |
| 4,553,811 A | 11/1985 | Becker et al. |
| 4,553,813 A | 11/1985 | McNaughton et al. |
| D282,174 S | 1/1986 | Kikuchi et al. |
| 4,580,295 A | 4/1986 | Richman |
| 4,591,711 A | 5/1986 | Taumberger |
| 4,595,839 A | 6/1986 | Braun et al. |
| 4,597,631 A | 7/1986 | Flores |
| 4,602,164 A | 7/1986 | Gore, III et al. |
| 4,611,884 A | 9/1986 | Roberts |
| 4,611,886 A | 9/1986 | Cline et al. |
| 4,612,670 A | 9/1986 | Henderson |
| 4,615,031 A | 9/1986 | Eales et al. |
| 4,616,899 A | 10/1986 | Schlafer |
| 4,616,900 A | 10/1986 | Cairns |
| 4,623,220 A | 11/1986 | Grabbe et al. |
| 4,625,333 A | 11/1986 | Takezawa et al. |
| 4,630,278 A | 12/1986 | Auffret et al. |
| 4,645,295 A | 2/1987 | Pronovost |
| 4,647,148 A | 3/1987 | Katagiri |
| 4,653,847 A | 3/1987 | Berg et al. |
| 4,661,959 A | 4/1987 | Kaneko |
| 4,665,529 A | 5/1987 | Baer et al. |
| 4,668,044 A | 5/1987 | D'Auria et al. |
| 4,673,245 A | 6/1987 | Kling et al. |
| 4,678,264 A | 7/1987 | Bowen et al. |
| 4,684,210 A | 8/1987 | Matsunaga et al. |
| 4,687,285 A | 8/1987 | Hily et al. |
| 4,699,455 A | 10/1987 | Erbe et al. |

| | | | | | |
|---|---|---|---|---|---|
| 4,701,013 A | 10/1987 | Jurczyszyn et al. | 5,020,873 A | 6/1991 | Althaus et al. |
| 4,702,556 A | 10/1987 | Ishii et al. | 5,026,134 A | 6/1991 | Sugawara et al. |
| 4,705,351 A | 11/1987 | Toda | 5,039,194 A | 8/1991 | Block et al. |
| 4,707,066 A | 11/1987 | Falkenstein et al. | 5,042,891 A | 8/1991 | Mulholland et al. |
| 4,707,067 A | 11/1987 | Haberland et al. | 5,043,775 A | 8/1991 | Lee |
| 4,708,429 A | 11/1987 | Clark et al. | 5,046,798 A | 9/1991 | Yagiu et al. |
| 4,714,315 A | 12/1987 | Krause | 5,047,835 A | 9/1991 | Chang |
| 4,720,630 A | 1/1988 | Takeuchi et al. | 5,048,919 A | 9/1991 | Ladany |
| 4,722,337 A | 2/1988 | Losch et al. | 5,050,953 A | 9/1991 | Anderson et al. |
| 4,722,586 A | 2/1988 | Dodson et al. | 5,065,226 A | 11/1991 | Kluitmans et al. |
| 4,726,648 A | 2/1988 | Haberland et al. | 5,067,785 A | 11/1991 | Schirbl et al. |
| 4,727,248 A | 2/1988 | Meur et al. | 5,069,522 A | 12/1991 | Block et al. |
| 4,730,198 A | 3/1988 | Brown et al. | 5,071,219 A | 12/1991 | Yurtin et al. |
| 4,732,446 A | 3/1988 | Gipson et al. | 5,073,045 A | 12/1991 | Abendschein |
| 4,737,008 A | 4/1988 | Ohyama et al. | 5,073,047 A | 12/1991 | Suzuki et al. |
| 4,744,626 A | 5/1988 | Mery | 5,074,682 A | 12/1991 | Uno et al. |
| 4,752,109 A | 6/1988 | Gordon et al. | 5,078,515 A | 1/1992 | Soulard et al. |
| 4,756,590 A | 7/1988 | Forrest et al. | 5,091,991 A | 2/1992 | Briggs et al. |
| 4,756,592 A | 7/1988 | Sasayama et al. | 5,093,879 A | 3/1992 | Bregman et al. |
| 4,756,593 A | 7/1988 | Koakutsu et al. | 5,099,307 A | 3/1992 | Go et al. |
| 4,762,388 A | 8/1988 | Tanaka et al. | 5,104,242 A | 4/1992 | Ishikawa |
| 4,762,395 A | 8/1988 | Gordon et al. | 5,104,243 A | 4/1992 | Harding |
| 4,763,225 A | 8/1988 | Frenkel et al. | 5,107,537 A | 4/1992 | Schriks et al. |
| 4,763,979 A | 8/1988 | Heywang | 5,109,453 A | 4/1992 | Edwards et al. |
| 4,767,178 A | 8/1988 | Sasaki et al. | 5,109,454 A | 4/1992 | Okuno et al. |
| 4,767,179 A | 8/1988 | Sampson et al. | 5,111,476 A | 5/1992 | Hollenbeck et al. |
| 4,778,240 A | 10/1988 | Komatsu | 5,113,404 A | 5/1992 | Gaebe et al. |
| 4,783,137 A | 11/1988 | Kosman et al. | 5,113,466 A | 5/1992 | Acarlar et al. |
| 4,787,706 A | 11/1988 | Cannon, Jr. et al. | 5,113,467 A | 5/1992 | Peterson et al. |
| 4,790,618 A | 12/1988 | Abe | 5,117,474 A | 5/1992 | van den Bergh et al. |
| 4,798,440 A | 1/1989 | Hoffer et al. | 5,117,476 A | 5/1992 | Yingst et al. |
| 4,799,757 A | 1/1989 | Goetter | 5,119,462 A | 6/1992 | Matsubara et al. |
| 4,802,178 A | 1/1989 | Ury | 5,121,451 A | 6/1992 | Grard et al. |
| 4,803,361 A | 2/1989 | Aiki et al. | 5,121,457 A | 6/1992 | Foley et al. |
| 4,803,689 A | 2/1989 | Shibanuma | 5,122,893 A | 6/1992 | Tolbert |
| 4,807,955 A | 2/1989 | Ashman et al. | 5,123,066 A | 6/1992 | Acarlar |
| 4,807,956 A | 2/1989 | Tournereau et al. | 5,124,281 A | 6/1992 | Ackerman et al. |
| 4,820,013 A | 4/1989 | Fuse | 5,125,849 A | 6/1992 | Briggs et al. |
| 4,834,490 A | 5/1989 | Falkenstein et al. | 5,127,071 A | 6/1992 | Go |
| 4,834,491 A | 5/1989 | Aoki et al. | 5,127,073 A | 6/1992 | Mulholland et al. |
| 4,836,635 A | 6/1989 | De Amorim | 5,127,074 A | 6/1992 | Watanabe et al. |
| 4,837,927 A | 6/1989 | Savage, Jr. | 5,134,679 A | 7/1992 | Robin et al. |
| 4,840,451 A | 6/1989 | Sampson et al. | 5,136,152 A | 8/1992 | Lee |
| 4,844,581 A | 7/1989 | Turner | 5,140,663 A | 8/1992 | Edwards et al. |
| 4,856,091 A | 8/1989 | Taska | D329,639 S | 9/1992 | Arvanitakis et al. |
| 4,861,134 A | 8/1989 | Alameel et al. | 5,146,078 A | 9/1992 | Luryi |
| 4,862,400 A | 8/1989 | Selbrede | D330,006 S | 10/1992 | Kamakura et al. |
| 4,863,233 A | 9/1989 | Nienaber et al. | 5,155,784 A | 10/1992 | Knott |
| 4,871,224 A | 10/1989 | Karstensen et al. | 5,155,785 A | 10/1992 | Holland et al. |
| 4,873,566 A | 10/1989 | Hokanson et al. | 5,155,786 A | 10/1992 | Ecker et al. |
| 4,875,752 A | 10/1989 | Suzuki | 5,159,190 A | 10/1992 | Hohberg et al. |
| 4,881,789 A | 11/1989 | Levinson | 5,163,109 A | 11/1992 | Okugawa et al. |
| 4,897,711 A | 1/1990 | Blonder et al. | 5,168,537 A | 12/1992 | Rajasekharan et al. |
| 4,903,340 A | 2/1990 | Sorensen | D333,122 S | 2/1993 | Kamakura et al. |
| 4,911,519 A | 3/1990 | Burton et al. | 5,193,099 A | 3/1993 | Chou |
| 4,912,521 A | 3/1990 | Almquist et al. | 5,195,155 A | 3/1993 | Shimaoka et al. |
| 4,913,511 A | 4/1990 | Tabalba et al. | 5,199,093 A | 3/1993 | Longhurst |
| 4,915,470 A | 4/1990 | Moore et al. | 5,201,018 A | 4/1993 | Coden et al. |
| 4,918,702 A | 4/1990 | Kimura | 5,202,943 A | 4/1993 | Carden et al. |
| 4,927,228 A | 5/1990 | Van De Pas | 5,206,766 A | 4/1993 | Bassett et al. |
| 4,944,568 A | 7/1990 | Danbach et al. | 5,212,751 A | 5/1993 | Brownjohn |
| 4,945,229 A | 7/1990 | Daly et al. | 5,212,754 A | 5/1993 | Basavanhally et al. |
| 4,945,400 A | 7/1990 | Blonder et al. | 5,212,761 A | 5/1993 | Petrunia |
| 4,962,990 A | 10/1990 | Matsuzawa et al. | 5,216,737 A | 6/1993 | Driessen et al. |
| 4,969,924 A | 11/1990 | Suverison et al. | 5,233,676 A | 8/1993 | Yonemura et al. |
| 4,977,329 A | 12/1990 | Eckhardt et al. | 5,241,614 A | 8/1993 | Ecker et al. |
| 4,979,787 A | 12/1990 | Lichtenberger | 5,243,678 A | 9/1993 | Schaffer et al. |
| D314,176 S | 1/1991 | Weber et al. | 5,247,530 A | 9/1993 | Shigeno et al. |
| 4,986,625 A | 1/1991 | Yamada et al. | 5,253,320 A | 10/1993 | Takahashi et al. |
| 4,989,934 A | 2/1991 | Zavracky et al. | 5,259,052 A | 11/1993 | Briggs et al. |
| 4,997,254 A | 3/1991 | Ganev | 5,259,053 A | 11/1993 | Schaffer et al. |
| 5,005,178 A | 4/1991 | Kluitmans et al. | 5,259,054 A | 11/1993 | Benzoni et al. |
| 5,005,939 A | 4/1991 | Arvanitakis et al. | 5,271,079 A | 12/1993 | Levinson |
| 5,011,246 A | 4/1991 | Corradetti et al. | 5,276,756 A | 1/1994 | Chambers et al. |
| 5,011,249 A | 4/1991 | Diaz | 5,280,191 A | 1/1994 | Chang |
| 5,013,247 A | 5/1991 | Watson | 5,283,680 A | 2/1994 | Okugawa et al. |

| | | |
|---|---|---|
| 5,283,802 A | 2/1994 | Hsiung |
| 5,285,511 A | 2/1994 | Akkapeddi et al. |
| 5,285,512 A | 2/1994 | Duncan et al. |
| 5,289,345 A | 2/1994 | Corradetti et al. |
| 5,295,214 A | 3/1994 | Card et al. |
| 5,325,454 A | 6/1994 | Rittle et al. |
| 5,325,455 A | 6/1994 | Henson et al. |
| 5,329,428 A | 7/1994 | Block et al. |
| 5,329,604 A | 7/1994 | Baldwin et al. |
| 5,333,221 A | 7/1994 | Briggs et al. |
| 5,333,225 A | 7/1994 | Jacobowitz et al. |
| 5,337,391 A | 8/1994 | Lebby |
| 5,337,396 A | 8/1994 | Chen et al. |
| 5,337,398 A | 8/1994 | Benzoni et al. |
| 5,345,524 A | 9/1994 | Lebby et al. |
| 5,345,530 A | 9/1994 | Lebby et al. |
| 5,347,604 A | 9/1994 | Go et al. |
| 5,353,364 A | 10/1994 | Kurashima |
| 5,361,244 A | 11/1994 | Nakamura et al. |
| 5,361,318 A | 11/1994 | Go et al. |
| D353,796 S | 12/1994 | Oliver et al. |
| 5,371,822 A | 12/1994 | Horwitz et al. |
| D354,271 S | 1/1995 | Speiser et al. |
| 5,412,497 A | 5/1995 | Kaetsu et al. |
| 5,414,787 A | 5/1995 | Kurata |
| 5,416,668 A | 5/1995 | Benzoni |
| 5,416,869 A | 5/1995 | Yoshino |
| 5,416,870 A | 5/1995 | Chun et al. |
| 5,416,871 A | 5/1995 | Takahashi et al. |
| 5,416,872 A | 5/1995 | Sizer, II et al. |
| 5,428,704 A | 6/1995 | Lebby et al. |
| 5,432,630 A | 7/1995 | Lebby et al. |
| 5,434,747 A | 7/1995 | Shibata |
| 5,436,997 A | 7/1995 | Makiuchi et al. |
| 5,440,658 A | 8/1995 | Savage, Jr. |
| 5,442,726 A | 8/1995 | Howard et al. |
| 5,446,814 A | 8/1995 | Kuo et al. |
| 5,452,387 A | 9/1995 | Chun et al. |
| 5,452,388 A | 9/1995 | Rittle et al. |
| 5,455,703 A | 10/1995 | Duncan et al. |
| 5,469,526 A | 11/1995 | Rawlings |
| 5,473,715 A | 12/1995 | Schofield et al. |
| 5,475,783 A | 12/1995 | Kurashima |
| 5,479,288 A | 12/1995 | Ishizuka et al. |
| 5,482,658 A | 1/1996 | Lebby et al. |
| 5,499,311 A | 3/1996 | DeCusatis |
| 5,499,312 A | 3/1996 | Hahn et al. |
| 5,511,140 A | 4/1996 | Cina et al. |
| 5,515,200 A | 5/1996 | Delrosso et al. |
| 5,515,468 A | 5/1996 | DeAndrea et al. |
| 5,526,160 A | 6/1996 | Watanabe et al. |
| 5,528,408 A | 6/1996 | McGinley et al. |
| 5,535,034 A | 7/1996 | Taniguchi |
| 5,535,296 A | 7/1996 | Uchida |
| 5,537,504 A | 7/1996 | Cina et al. |
| 5,546,281 A | 8/1996 | Poplawski et al. |
| 5,548,676 A | 8/1996 | Savage, Jr. |
| 5,548,677 A | 8/1996 | Kakii et al. |
| 5,550,941 A | 8/1996 | Lebby et al. |
| 5,555,333 A | 9/1996 | Kato |
| 5,561,727 A | 10/1996 | Akita et al. |
| 5,596,663 A | 1/1997 | Ishibashi et al. |
| 5,604,831 A | 2/1997 | Dittman et al. |
| 5,631,989 A | 5/1997 | Koren et al. |
| 5,636,298 A | 6/1997 | Jiang et al. |
| 5,640,407 A | 6/1997 | Freyman et al. |
| 5,659,641 A | 8/1997 | DeMeritt et al. |
| 5,687,267 A | 11/1997 | Uchida |
| 5,698,849 A | 12/1997 | Figueria, Jr. |
| D389,123 S | 1/1998 | Vernon |
| D389,802 S | 1/1998 | Vernon |
| 5,708,743 A | 1/1998 | DeAndrea et al. |
| 5,717,533 A | 2/1998 | Poplawski et al. |
| 5,732,176 A | 3/1998 | Savage, Jr. |
| 5,734,558 A | 3/1998 | Poplawski et al. |
| 5,736,782 A | 4/1998 | Schairer |
| 5,738,538 A | 4/1998 | Bruch et al. |
| 5,757,998 A | 5/1998 | Thatcher et al. |
| 5,761,229 A | 6/1998 | Baldwin et al. |
| 5,767,999 A | 6/1998 | Kayner |
| 5,774,614 A | 6/1998 | Gilliland et al. |
| D396,210 S | 7/1998 | Shiga et al. |
| 5,778,127 A | 7/1998 | Gilliland et al. |
| 5,812,582 A | 9/1998 | Gilliland et al. |
| 5,812,717 A | 9/1998 | Gilliland et al. |
| 5,815,623 A | 9/1998 | Gilliland et al. |
| 5,864,468 A | 1/1999 | Poplawski et al. |
| 5,879,173 A | 3/1999 | Popawski et al. |
| 5,896,480 A | 4/1999 | Scharf et al. |
| 5,898,812 A | 4/1999 | Vanoli |
| 5,901,263 A | 5/1999 | Gaio et al. |
| 5,913,002 A | 6/1999 | Jiang |
| 6,024,500 A * | 2/2000 | Wolf ........................... 385/92 |
| 6,047,172 A | 4/2000 | Babineau et al. |
| 6,059,463 A | 5/2000 | Althaus et al. |
| 6,061,493 A | 5/2000 | Gilliland et al. |
| 6,062,893 A | 5/2000 | Miskin et al. |
| 6,071,017 A | 6/2000 | Gilliland et al. |
| 6,072,613 A | 6/2000 | Henningsson et al. |
| 6,085,006 A | 7/2000 | Gaio et al. |
| RE36,820 E | 8/2000 | McGinley et al. |
| 4,217,030 A | 8/2000 | Howarth |
| 6,120,191 A | 9/2000 | Asakura et al. |
| 6,142,802 A | 11/2000 | Berg et al. |
| 6,200,041 B1 | 3/2001 | Gaio et al. |
| 6,201,704 B1 | 3/2001 | Poplawski et al. |
| 6,206,582 B1 | 3/2001 | Gilliland |
| 6,213,651 B1 * | 4/2001 | Jiang et al. ................ 385/92 |
| 6,220,878 B1 | 4/2001 | Poplawski et al. |
| 6,241,534 B1 | 6/2001 | Neer et al. |
| 6,267,606 B1 | 7/2001 | Poplawski et al. |
| D446,501 S | 8/2001 | Donnell et al. |
| 6,282,000 B1 | 8/2001 | Kikuchi et al. |
| 6,335,869 B1 | 1/2002 | Branch et al. |
| 6,341,899 B1 | 1/2002 | Shirakawa et al. |
| 6,369,924 B1 | 4/2002 | Scharf et al. |
| 6,461,058 B1 | 10/2002 | Birch et al. |
| 2001/0024551 A1 * | 9/2001 | Yonemura et al. ............ 385/88 |
| 2002/0028049 A1 * | 3/2002 | Bartur et al. ................ 385/92 |
| 2003/0235375 A1 * | 12/2003 | Kamath et al. ............... 385/92 |

OTHER PUBLICATIONS

Crow, John, et al.; The Jitney Parallel Optical Interconnect, 1996 Electronic components and Technology Conference, p. 292–300, (month unknown).

Rosinski, Bogdan, et al.; Multichannel Transmission of a Multicore Fiber Coupled with Vertical–Cavity Surface–Emitting Lasers, Journal of Lightwave Technology, vol. 17, No. 5, May 1999.

Heinrich, J. et al.; Low–cost VCSEL–Transceiver Module for Optical Data Busses, 1997 IEEE, (month unknown).

Buczynski, R., et al.; Fast Optical Thresholding with an Array of Optoelectronic Transceiver Elements, IEEE Photonics Technology Letters, vol. 11, No. 3, Mar. 1999.

R.T. Chen and R.S. Guilfoyle (Eds.); Optoelectronic Interconnects and Packaging; Critical Reviews, vol. CR62; (1996); pp. 48–63; 64–67; 229–243; 393–404; 405–414; 442–460; Spie Optical Engineering Press; Washington, (month unknown).

R.G. Hunsperger; Integrated Optics: Theory and Technology ($2^{nd}$ Ed); 1985; pp. 89–106; 236–245; Springer–Verlag Berlin Heidelberg; Germany, (month unknown).

A. Chatak and K. Thyagarajan; Introduction to Fiber Optics; 1998; pp. 411–413; 447–449; 467–473; Cambridge University Press; United Kingdom, (month unknown).

R.C. Dorf; Electrical Engineering Handbook; 1993; pp. 1682–1684; CRC Press, Inc. Florida, (month unknown).

* cited by examiner

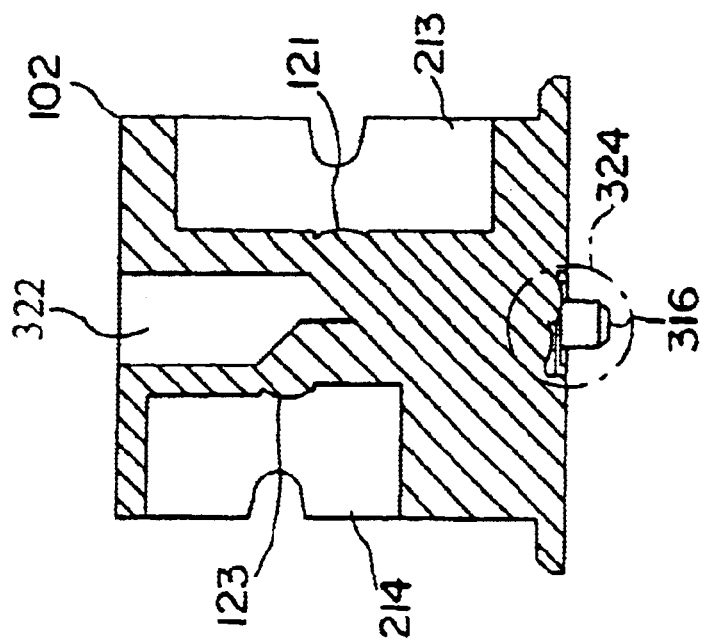
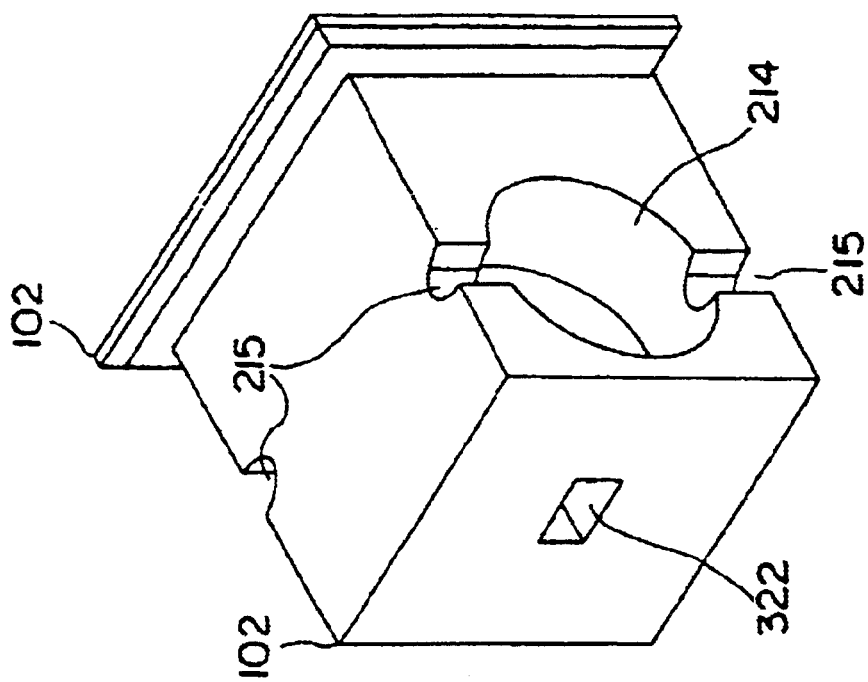

METHOD AND APPARATUS FOR VERTICAL BOARD CONSTRUCTION OF FIBER OPTIC TRANSMITTERS, RECEIVERS AND TRANSCEIVERS

CROSS REFERENCE TO RELATED APPLICATIONS

This application claims the benefit and is a continuation of U.S. Application No. 09/320,409 filed May 26, 1999 by Jian et al, now issued as U.S. Pat. No. 6,213,651.

FIELD OF THE INVENTION

This invention relates generally to light bending devices. More particularly, the invention relates to fiber optic modules.

BACKGROUND OF THE INVENTION

Fiber optic modules interface optical fibers to electronic circuitry transducing communication by light or photons with communication by electrical signals. A fiber optic module may be a fiber optic receiver, transmitter or transceiver including both receive and transmit functions. The fiber optic receiver, transmitter and transceiver each have optical elements (OE) and electrical elements (EE). The fiber optic transmitter OE includes an emitter (such as a semiconductor LED or Laser) mounted in a package and an optical coupling element for coupling light or photons from the OE into the optical fiber. The type of semiconductor laser (light amplification by stimulated emission of radiation) may be a vertical cavity surface emitting laser (VCSEL). The fiber optic receiver OE includes a photodetector (such as a photodiode) mounted in a package and an optical coupling element for coupling light or photons from the optical fiber into the photodetector. The EE for each includes integrated circuits and passive elements mounted on a substrate such as a printed circuit board (PCB) or ceramic. The OE and EE are connected electrically at the emitter and photodetector.

Because of the high transmission frequencies utilized in fiber optic communication, crosstalk between receive and transmit signals is of concern. Additionally, electromagnetic interference (EMI) is of concern due to the high frequency of operation of the fiber optic modules. In order to reduce EMI, shielding of the electrical components is required which is usually accomplished by attaching a metal shield to the substrate of the fiber optic module and connecting it to ground. In order to avoid electronic crosstalk and EMI, the fiber optic transceiver usually employs separate components and separate shielding of fiber optic receiver and fiber optic transmitter components. In order to avoid optical crosstalk where light or photons can interfere between communication channels, the fiber optic transceiver usually employs separate optical elements for coupling light or photons into and out of the optical fiber for fiber optic receiver and fiber optic transmitter. Using separate optical elements requires additional components and increases the costs of fiber optic transceivers. It is desirable to reduce the component count of fiber optic transceivers such that they are less expensive to manufacture.

The form factor or size of the fiber optic module is of concern. Previously, the fiber optic transceiver, receiver, and transmitter utilized horizontal boards or substrates which mounted parallel with a system printed circuit board utilized significant footprint or board space. The horizontal boards provided nearly zero optical crosstalk and minimal electronic crosstalk when properly shielded. However, the horizontal boards, parallel to the system printed circuit board, required large spacing between optical fiber connectors to make the connection to the optical fibers. While this may have been satisfactory for early systems using minimal fiber optic communication, the trend is towards greater usage of fiber optic communication requiring improved connectivity and smaller optical fiber connectors to more densely pack them on a system printed circuit board. Thus, it is desirable to minimize the size of system printed circuit boards (PCBs) and accordingly it is desirable to reduce the footprint of the fiber optic module which will attach to such system PCBs. Additionally, the desire for tighter interconnect leads of fiber optic cables, restricts the size of the OE's. For example, in the common implementation using TO header and can, the header dimension of the interconnect lead is normally 5.6 mm. In small form factor optical modules, such as the MT family, the two optical fibers are separated by a distance of only 0.75 mmm. This severely restricts the method of coupling light or photons from the OE into and out of fiber optic cables.

BRIEF SUMMARY OF THE INVENTION

Briefly, the present invention includes a method, apparatus and system for method and apparatus for vertical board construction of fiber optic transmitters, receivers and transceivers as described in the claims. Fiber optic transmitter and receiver electrical elements are implemented on two separate substantially parallel boards in a fiber optic module. The parallel boards are mount substantially perpendicular to the base of the fiber optic module and the system printed circuit board to which it attaches, to reduce the footprint of the fiber optic module. In one embodiment, bending light or photons through ninety degrees, the light transmitter (a packaged type of emitter) and a light receiver (a packaged type of photodetector) are each mounted substantially perpendicular to the transmit and receive boards respectively such that their active areas are nearly facing each other but offset. A single optical block implements lenses and reflecting surfaces to minimize manufacturing costs. The light receiver and light transmitter are mounted offset from each other in the optical block in order to avoid optical cross talk. In a second embodiment, the light transmitter (emitter) and the light receiver (photodetector) are each mounted substantially parallel with the transmit and receive boards respectively and the connection to the optical fibers. The separate and substantially parallel receive and transmit boards are provided with ground planes on back sides in order to minimize electrical cross talk. A module outer shielded housing, manufactured out of metal or metal plated plastic, provides further shielding for EMI. The substantially parallel boards may be extended to support multiple channels or multiple parallel fibers such as in a ribbon optical fiber cable. Manufacturing steps of the boards for the fiber optic module are disclosed to provide reduced manufacturing costs.

BRIEF DESCRIPTIONS OF THE DRAWINGS

FIG. 3D is a back side perspective view from the right of the optic block for the first embodiment of the present invention.

FIG. 3H is a cross-sectional view of the optic block for the first embodiment of the present invention.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention includes a method, apparatus and system for method, apparatus and system for vertical board construction of fiber optic transmitters, receivers and transceivers. Briefly, fiber optic transmitter and receiver electrical elements are implemented on two separate substantially parallel boards in a fiber optic module. The parallel boards are mount substantially perpendicular to the base of the fiber optic module and the system printed circuit board to which it attaches, to reduce the footprint of the fiber optic module. In one embodiment, bending light or photons through ninety degrees, the light transmitter (a packaged type of emitter) and a light receiver (a packaged type of photodetector) are each mounted substantially perpendicular to the transmit and receive boards respectively such that their active areas are nearly facing each other but offset. A single optical block implements lenses and reflecting surfaces to minimize manufacturing costs. The light receiver and light transmitter are mounted offset from each other in the optical block in order to avoid optical cross talk. In a second embodiment, the light transmitter (emitter) and the light receiver (photodetector) are each mounted substantially parallel with the transmit and receive boards respectively and the connection to the optical fibers. The separate and substantially parallel receive and transmit boards are provided with ground planes on back sides in order to minimize electrical cross talk. Preferably the ground planes on the back sides of the printed circuit boards face each other. A module outer shielded housing, manufactured out of metal or metal plated plastic, provides further shielding for EMI. The substantially parallel boards may be extended to support multiple channels or multiple parallel fibers such as in a ribbon optical fiber cable. Manufacturing steps of the boards for the fiber optic module are disclosed to provide reduced manufacturing costs.

Figure 1:
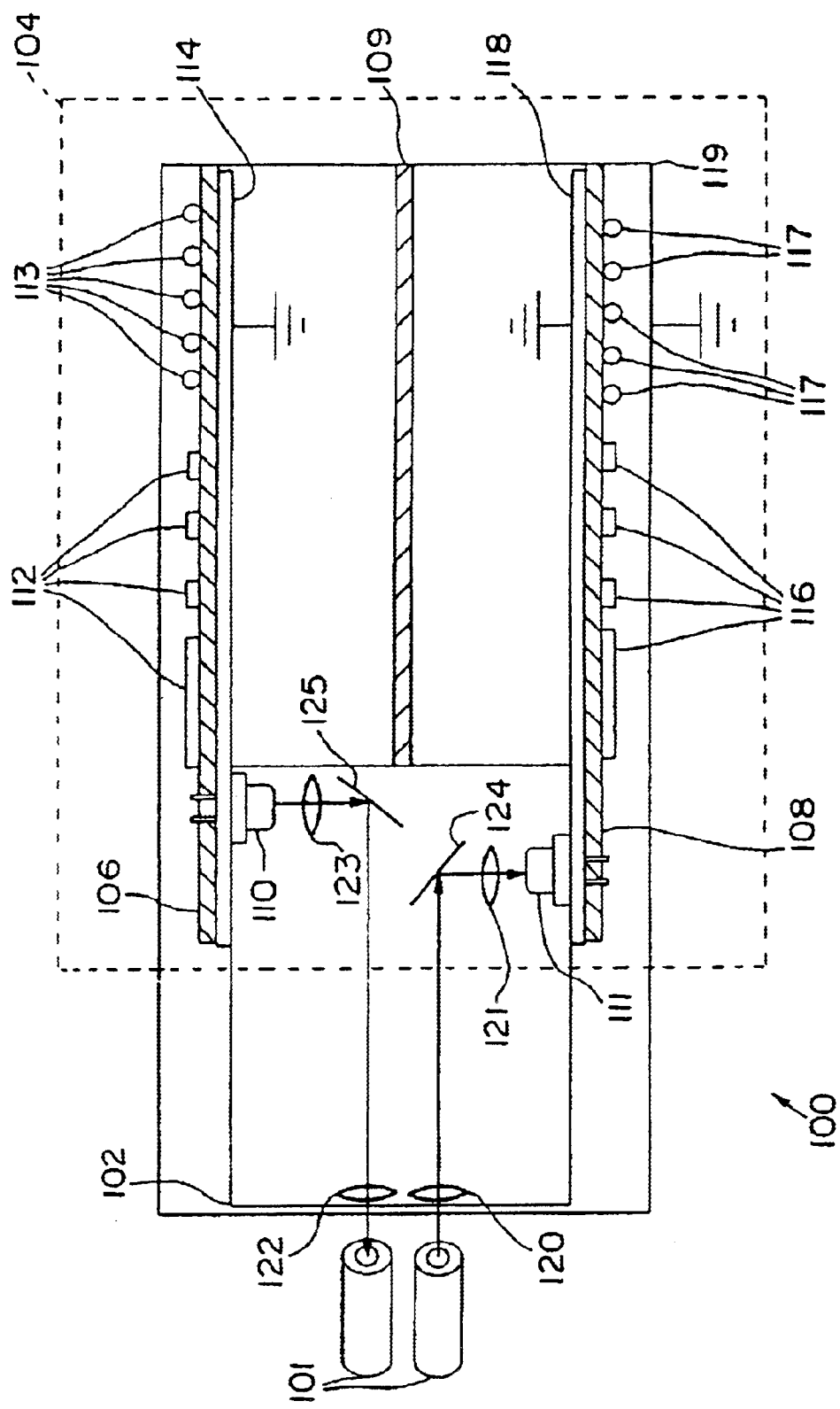
FIG. 1 is a simplified top cutaway view of a first embodiment of the present invention.

Referring now to FIG. 1, a simplified cutaway view of the first embodiment of the present invention is illustrated. FIG. 1 illustrates a fiber optic module 100 coupling to a pair of fiber optic cables 101 Fiber optic module 100 includes an optical block 102 and an electrical element 104. The electrical element 104 includes a transmit printed circuit board (PCB) 106, a receive PCB 108, an optional internal shield 109, a light transmitter 110, a light receiver 111, and a shielded housing 119. The light transmitter 110 and light receiver 111 are optoelectronic devices for communicating with optical fibers using light of various wavelengths or photons. An optoelectronic device is a device which can convert or transduce light or photons into an electrical signal or an electrical signal into light or photons. The transmitter 110 is a packaged emitter, that converts an electrical signal into emitting light or photons, such as a semiconductor laser or LED, preferably packaged in a TO can. The receiver 111 is a packaged photodetector, that detects or receives light or photons and converts it into an electrical signal, such as a photo diode, preferably package in a TO can. However other packages, housings or optoelectronic devices for receiving and transmitting light or photon may be used for the receiver 111 or transmitter 110.

Each of the optoelectronic devices, receiver 111 and transmitter 110, have terminals to couple to thruholes of the PCBs 106 and 108. The transmit PCB 106 includes electrical components 112 (transmitter integrated circuit (laser driver), resistors, capacitors and other passive or active electrical components), pins 113, and a ground plane 114. The electrical components 112 control the transmitter 110 and buffer the data signal received from a system for transmission over an optical fiber. The receive PCB 108 includes electrical components 116 (receiver integrated circuit (transimpedance amplifier and post amplifier), resistors, capacitors and other passive or active electrical components), pins 117, and a ground plane 118. The electrical components 116 control the receiver 111 and buffer the data signal received from an optical fiber. The ground planes 114 and 118 and the shielded housing 119 are coupled to ground. The electrical components 116 and pins 117 are sandwiched between the ground plane 118 and the shielding 119 to shunt electromagnetic fields to ground and avoid crosstalk in the receive PCB 108. Electrical components 112 and pins 113 are sandwiched between the ground plane 114 and the shielded housing 119 to shunt electromagnetic fields generated by these components to ground and avoid crosstalk in the transmit PCB 106. Optional internal shielding 109 further provides additional crosstalk protection between printed circuit boards. If ground planes 114 and 118 are not used, then internal shielding 109 is required to reduce the electromagnetic fields that may be generated.

The optical block 102 includes lenses 1209–123 and reflectors 124–125. Lenses 120–123 may be any collimating lenses including aspheric lenses, ball lenses, and GRIN lenses. Lenses 121–123 may be symmetric (circular symmetry) or asymmetric to provide optical steering. Lens 123 is for collimating the light or photons diverging from the transmitter 110 and lens 122 is for focussing the collimated light or photons into an optical fiber. Lens 120 is for collimating the light or photons diverging out from the end of an optical fiber and lens 121 is for focusing the collimated light or photons into the receiver 111. Reflectors 124–125 may be facets formed in the optical block having angles to provide total internal reflection between the optical block material and the atmosphere. Preferably they are forty five degree angle facets. Alternatively, they may be facets coated with a reflective surface or mirror surface to reflect light or photons off the reflective coated surface or facets having an optical grating surface to reflect photons. The optical block 102 is constructed of a thermoplastic or polycarbonate which is clear to the desired wavelengths of light or photons. The reflectors 124–125, lenses 120–123 and other elements of the optical block 102 described below are formed through injection molding of the desired material.

Figure 2:
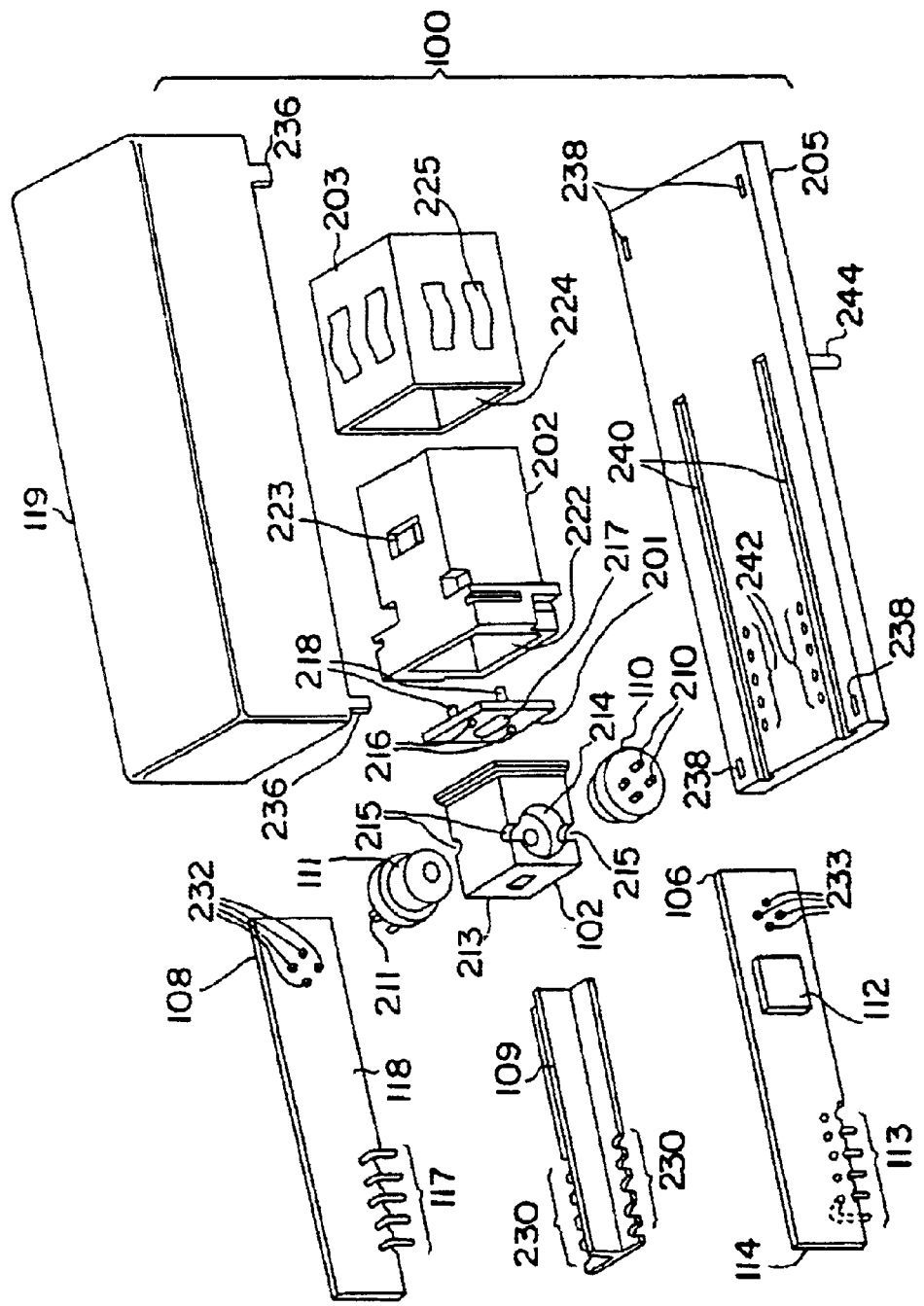
FIG. 2 is an exploded view of the first embodiment of the present invention.

Referring to FIG. 2, an exploded diagram of the fiber optic module 100 is illustrated and its assembly is described. Transmitter 110 is inserted into an opening 214 in the optical block 102. Receiver ill is inserted into an opening 213 in optical block 102. An epoxy is injected into top and bottom tacking holes 215 in order to hold the transmitter 110 and receiver 111 in openings 214 and 213 respectively. An MT alignment plate 201 has optical block alignment holes 216, an optical opening 217 and fiber optic connector alignment pins 218 for alignment purposes. The optical block holes 216 couple to optical block alignment pins in the optical block 102, not illustrated in FIG. 2. The fiber optic connector alignment pins 218 are for aligning optical fibers that couple to the fiber optic module 100.

For coupling to a fiber optic connector, the fiber optic module 100 has a nose 202 and a nose shield 203. The nose 202 includes a optical fiber opening 222 and a latch opening 223. The latch opening 223 receives the optical fiber connector and holds the optical fiber substantially fixed in place and aligned with the optical opening 217 of the alignment plate 201. The nose shield 203 includes an opening 224 for insertion over the nose 202 and shield tabs 225 for coupling to the ground plane of the package. The nose shielding 203 further reduces EMI.

After assembling the nose pieces to the optical block 102, the transmitter 110 and receiver 111 may be aligned to provide optimal light or photon output and reception. Alignment of the transmitter 110 and receiver 111 in optical block 102 is performed by active alignment where the receiver 111 and transmitter 110 are powered up to detect and emit photons. The receiver 111 and transmitter 110 are properly aligned in the optical block 102 to provide maximum photon detection from or coupling into fiber 101. The tacking holes 215 extend into the openings 213 and 214 such that epoxy may be poured in to hold the optoelectronic devices to the optical block. After alignment is complete, the epoxy is UV cured and allowed to set such that the receiver 111 and transmitter 110 are substantially coupled to the optical block 102.

After the epoxy has set, the receive PCB 108 and the transmit PCB 106 may be attached to the receiver 111 and transmitter 110 respectively. Receiver thruholes 232 in the receive PCB 108 are aligned and slid over terminals 211 of the receiver 111. The terminals 211 are then soldered to make an electrical connection on the component side (opposite the side of the ground plane 118) of the receive PCB 108. Transmitter thruholes 233 in the transmit PCB 106 are aligned and then slid over the terminals 210 of the transmitter 110. The terminals 210 are then soldered to make an electrical connection on the component side (opposite the side of the ground plane 114) of transmit PCB 106. Ground planes 114 and 118 have sufficient material removed around the transmitter thruholes 233 and the receiver thruholes 232 respectively to avoid shorting the terminals of the transmitter 110 and receiver 111 to ground.

After coupling the PCBs 108 and 106 to the receiver 111 and transmitter 110 respectively, the assembly is inserted into the shielded housing 119. The optional internal shield 109 is next assembled into the shielded housing 119 between the PCBs 106 and 108. The optional internal shield 109 has pin slots 230 to surround the pins 113 and 117 and avoid shorting thereto.

The shielded housing 119 includes clips 236 at each corner for mating to a base 205. The base 205 includes PCB slots 240, clip openings 238 into which the clips 236 may be inserted, and base pin holes 242 into which the PCB pins 113 and 117 may be inserted. The base 205 includes a guide post 244 for mounting the fiber optic module into a system printed circuit board. The bottom of the base mounts parallel to the printed circuit board of the system such that when horizontal, the receive PCB 108 and the transmit PCB 106 are vertical and substantially perpendicular in reference to the printed circuit board of the system and the base 205. Next in assembly, the base 205 has its base pin holes 242 slid over the PCB pins 113 and 117, the printed circuit boards 106 and 108 are guided to mate with the PCB slots 240, and the clips 236 of the shielded housing 119 are guided into the clip openings 238. The receive PCB pins 113 and the transmit PCB pins 117 are vertical and substantially perpendicular in reference to the printed circuit board of the system and the base 205. After coupling the base 205 to the shielded housing 119, the clips 236 are bent, twisted, or otherwise changed in order to hold the base 205 in place. As an alternative to clips 236 and clip openings 238, the shielded housing 119 may use plastic clips, or a ridge, integrated into each side that couples to base 205 appropriately. The shielded housing 119, which is coupled to ground, encases the PCBs 106 and 108 to reduce the electromagnetic fields generated by the electrical components coupled thereto by shunting the electric fields to ground to reduce electromagnetic interference (EMI).

Figure 3A:
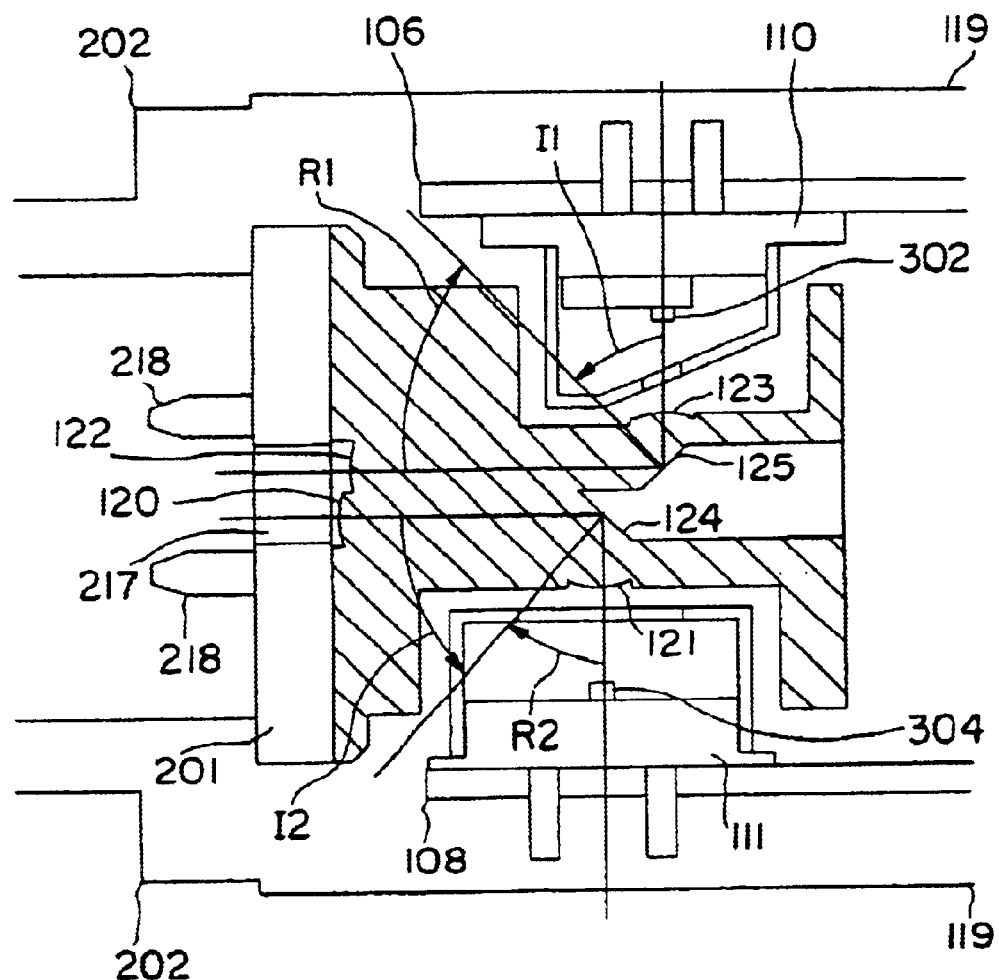
FIG. 3A is a cross-sectional view from the top of the optic block for the first embodiment of the present invention.

Referring now to FIG. 3A, a cross-sectional view of the optical block 102 for the first embodiment is illustrated. The transmitter 110, the receiver 111, and the MT alignment plate 201 are coupled to the optical block 102. The light transmitter 110 includes an emitter 302 for generation of light or photons in response to electrical signals from the transmit PCB 106. The light receiver 111 includes a detector 304 to receive light or photons and generate electrical signals in response to light or photons coupled thereto. Light or photons emitted by the emitter 302 are coupled into lens 123 and collimated onto the reflector 125 at an incident angle Il (angle with the perpendicular to reflector 125 surface) of substantially forty five degrees. Reflector 125 reflects the incident light or photons on a refraction angle R1 (angle with the perpendicular to reflector 125 surface) equivalent to incident angle Il of substantially forty five degrees. The reflected light or photons travel perpendicular to the incident light or photons towards the lens 122. Lens 122 focuses the light or photons from the emitter 302 into an aligned optical fiber through the optical port 217 in the MT alignment plate 201. Thus, light or photons coup led or launched into an optical fiber, defining a first optical axis, are substantially perpendicular to the flight or photons emitted and incident upon lens 123 from the emitter 302 of the transmitter 110.

Light or photons, incident from a fiber optic cable coupled to the fiber optic module 100, is received through the optical port 217 of the MT alignment plate 201. Light or photons from the fiber optic cable are aligned to be incident upon the lens 120. Lens 120 collimates the incident light or photons from a fiber optic cable onto the reflector 124 at an incident angle I2 of substantially forty five degrees. Reflector 124 reflects incident light or photons at a refractive angle R2 equivalent to incident angle I2 of substantially forty five degrees towards lens 121. Lens 121 focuses the light or photons received from a fiber optical cable onto the detector 304. Light or photons incident from a fiber optic cable, defining a second optical axis, are substantially perpendicular to the light or photons incident upon the detector 304.

Figure 3I:
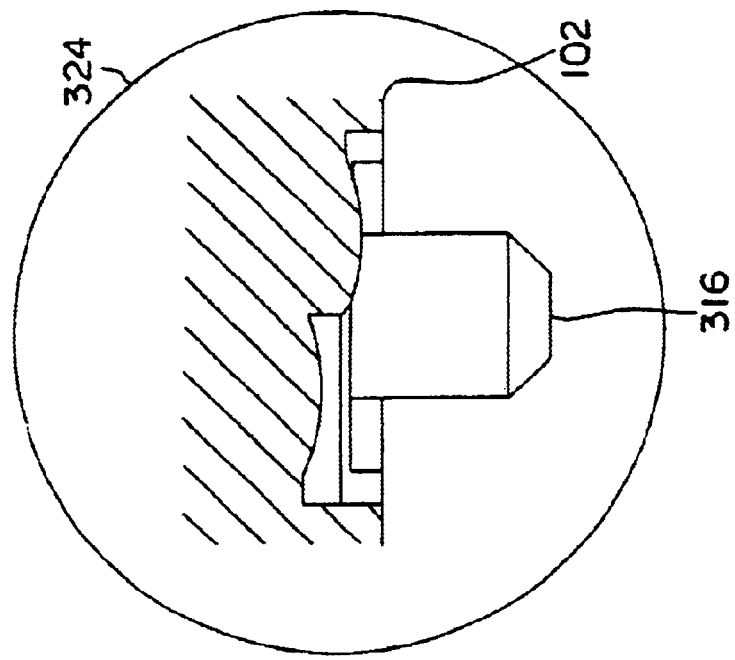
FIG. 3I is a magnified cross-sectional view of the alignment post of the optic block.
Figure 3B:
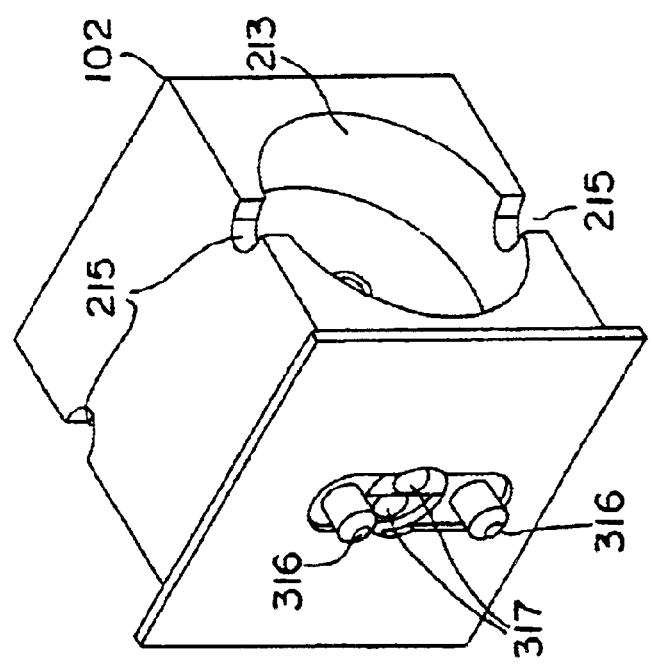
FIG. 3B is a front side perspective view from the left of the optic block for the first embodiment of the present invention.

FIG. 3B illustrates a frontal perspective view from the left side of the optical block 102. The front side of the optical block 102 includes optical block alignment pins 316 and an optical output opening 317. The optical block alignment pins 316 couple to the alignment holes 216 of the alignment plate 201 such that the optical output opening 317 is aligned with the optical port 217 in the alignment plate 201. FIG. 3C illustrates the front side of the optical block 102. The optical output opening 317 is indicated.

FIG. 3D is a back side perspective view from the right of the optical block 102. The back side of the optical block 102 includes a cavity 322 that is used to form the shape of the reflective surfaces 124–125 during manufacturing of the optical block 102. FIG. 3E is a back view of the optic block illustrating the opening into the cavity 322.

Figure 3F:
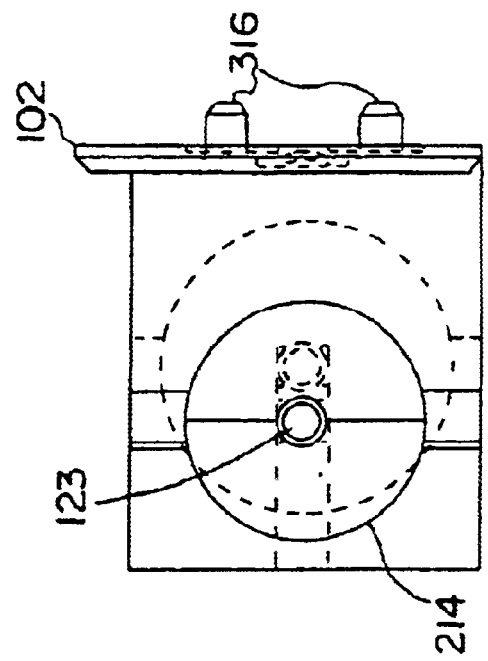
FIG. 3F is a right side view of the optic block for the first embodiment of the present invention.
Figure 3C:
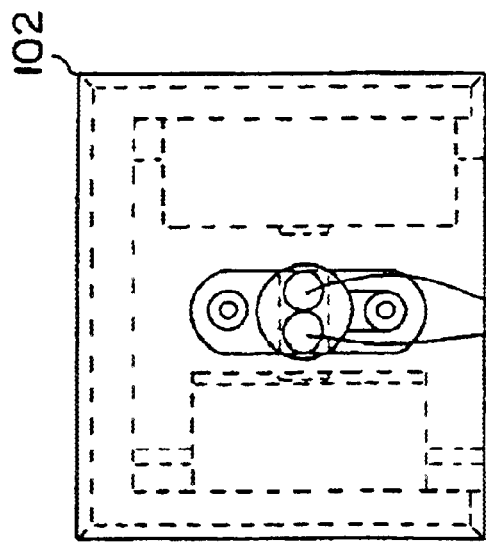
FIG. 3C is a frontal view of the optic block for the first embodiment of the present invention.
Figure 3E:
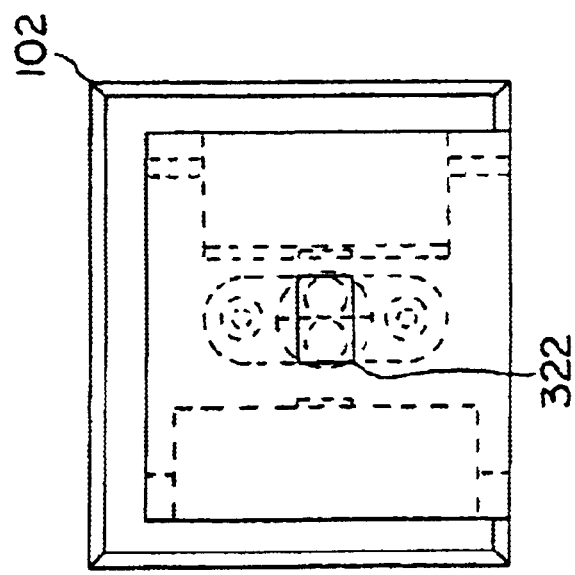
FIG. 3E is a back view of the optic block for the first embodiment of the present invention.
Figure 3G:
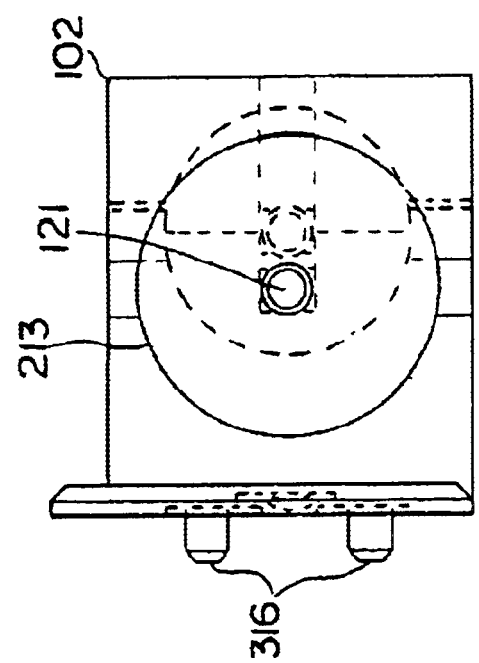
FIG. 3G is a left side view of the-optic block for the first embodiment of the present invention.

FIG. 3F illustrates the right side of the optical block 102 which has the opening 214 to mate with the type of housing of the transmitter 110. The lens 123 can be viewed near the center of the opening 214. FIG. 3G illustrates the left side of the optical block 102. which has the opening 213 to mate with the type of housing of the receiver 111. The lens 121 can be viewed near the center of the opening 213. Comparing FIGS. 3F and 3G, the offset between openings 213 and 214 to avoid optical crosstalk is visible. In the preferred embodiment, receiver 111 is closer to the optical opening 317 in order to minimize the loss of incoming received optical power. However, the position of receiver 111 and transmitter 110 can be interchanged. FIG. 3H is a cross-sectional view of the optical block 102 illustrating the relative position of the optical block alignment posts 316. The area 324 surrounding the alignment post 316 is magnified in FIG. 3I. FIG. 3I provides a magnified cross-sectional view of the alignment post 316.

Figure 4:
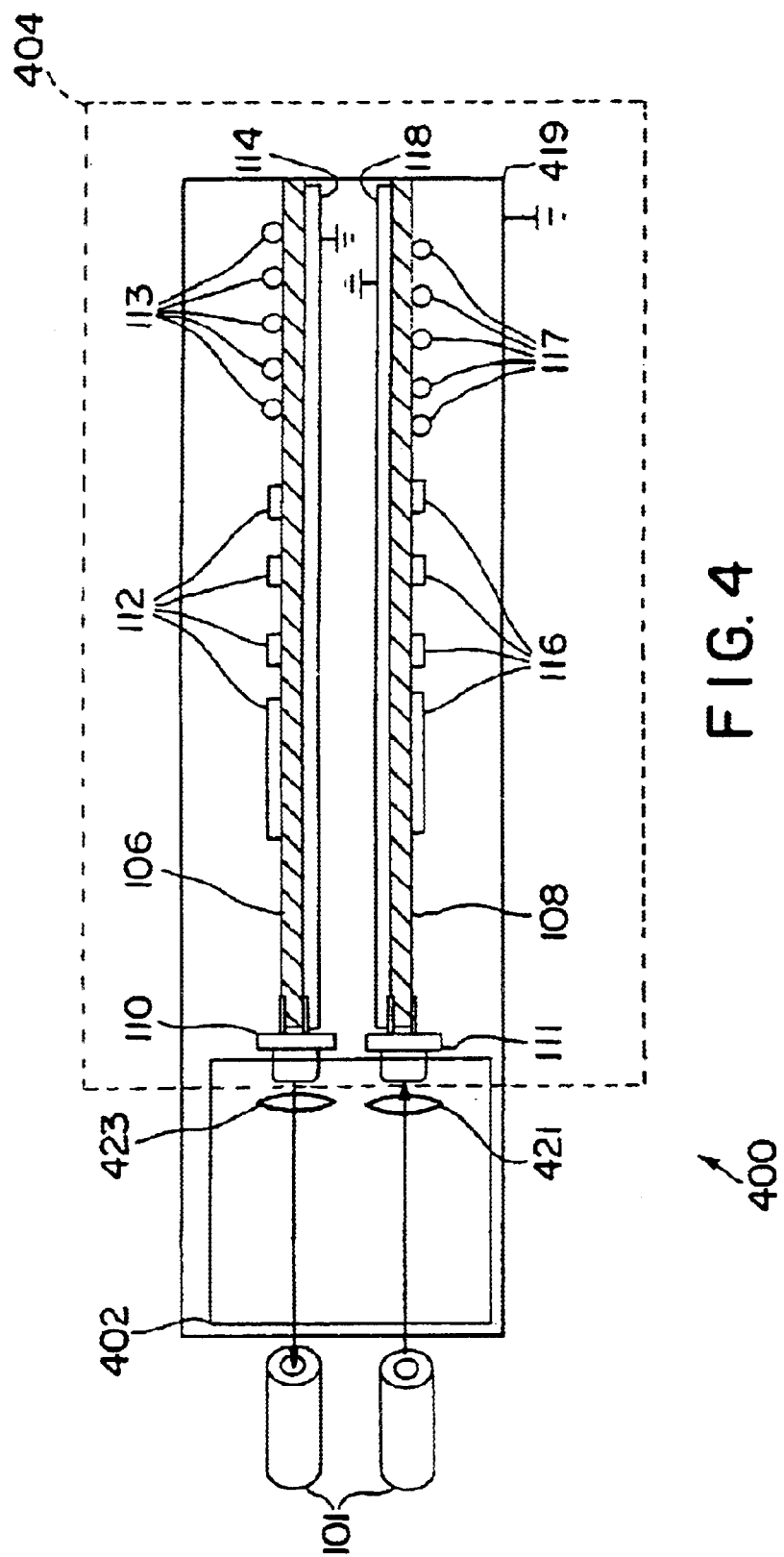
FIG. 4 is a simplified top cutaway view of a second embodiment of the present invention.

FIG. 4 illustrates a second embodiment of the present invention. To couple to the optical fibers 101, a fiber optic module 400 includes an optical block 402 and electrical elements 404. Electrical elements 404 include transmitter PCB 106, receiver PCB 108, light receiver 111, light transmitter 110, and a shielded housing 419. Shielded housing 419 may be narrower than shielded housing 119 due to receiver 111 and transmitter 110 being parallel with the PCBs 108 and 106. Optical block 402 includes lens 423 and lens 421 for coupling light or photons into and out of the fiber optic cable 101. Lens 423 and 421 may be spherical lenses or each may be a pair of aspheric lenses on the same optical axis. Light or photons emitted by the transmitter 110 are collected and focused by lens 423 into a transmit fiber optic cable. Light or photons on a receive fiber optic cable are collected and focused by lens 421 into the receiver 111. In this manner, fiber optic module 400 keeps light or photons substantially in parallel and does not have to reflect the light or photons to couple it is with receiver 111 or transmitter 110.

Figure 5:
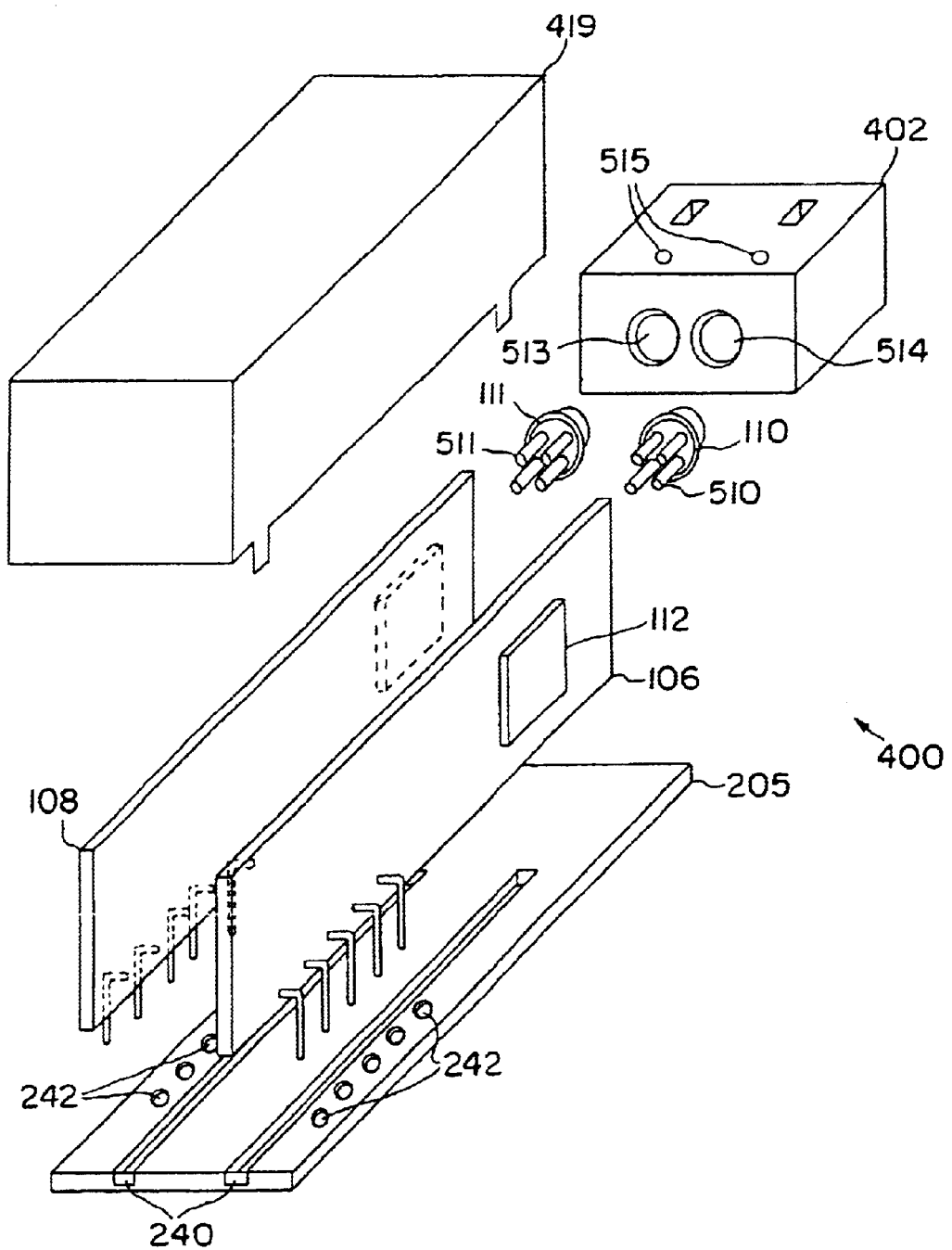
FIG. 5 is an exploded view of the second embodiment of the present invention.

FIG. 5 illustrates an exploded diagram of the fiber optic module 400. Fiber optic module 400 is assembled similar to fiber optic module 100 as previously described with reference to FIG. 2. However, optical block 402 differs from optical block 102. Receiver 111 and transmitter 110 are inserted into openings 513 and 514 respectively in the optical block 402. An epoxy is injected in top and bottom tacking holes 515 of the optical block 402 and the receiver 111 and transmitter 110 are tested and aligned to substantially couple light or photons into and out of fiber optic cables. After the epoxy is set and the receiver and transmitter are substantially fixed in the optical block 102, the transmit PCB 106 and the receive PCB 108 are coupled respectively to the transmitter 110 and the receiver 111. The terminals 511 and 510 of the receiver 111 and the transmitter 110 respectively are soldered directly onto the PCB. The high frequency pins associated with the receiver 111 and transmitter 110 are preferably soldered on the component side of the printed circuit boards in order to provide proper shielding. The alignment plate 201, the nose 202 and the nose shielding 203 are unnecessary in this embodiment of the present invention. Fiber ferrules are utilized instead for alignment between the optical block 402 and the optical fibers 101.

Figure 6A:
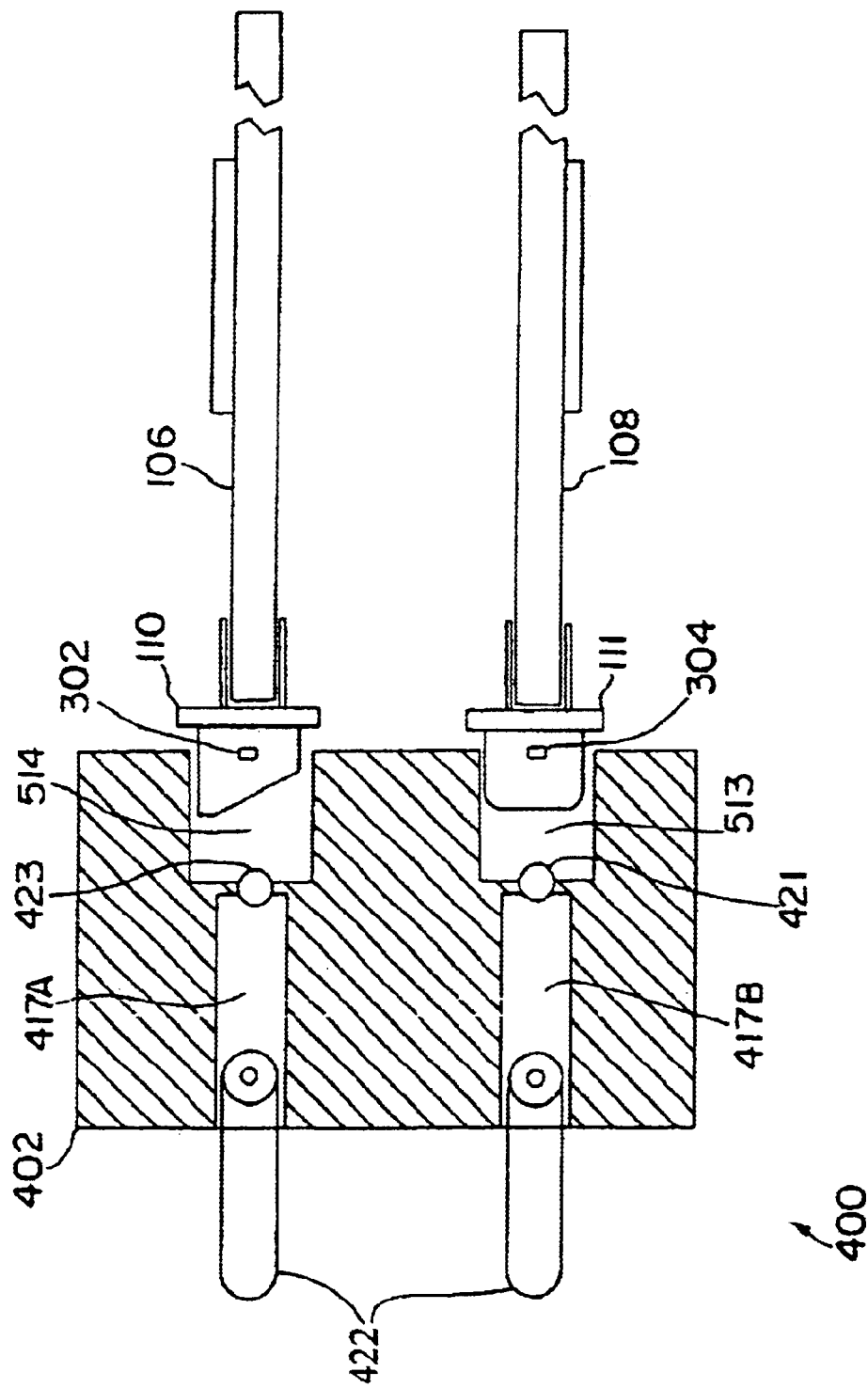
FIG. 6A is a cross-sectional view from the top of the optic block for the second embodiment of the present invention.

Referring now to FIG. 6A, a cross-sectional view of the optical block 402 for the second embodiment is illustrated. The transmitter 110 and the receiver 111 are coupled to the optical block 402. The transmitter 110 includes an emitter 302 for generation of light or photons. The receiver 111 includes a detector 304 to receive light or photons. Light or photons emitted by the emitter 302 are coupled into lens 423, collected and focused into the optical fiber through the optical port 417A. Light or photons, incident from a fiber optic cable coupled to the fiber optic module 400, is received through the optical port 417B. Photons from the fiber optic cable are incident upon the lens 421. Lens 421 collects and focuses the incident light or photons from the fiber optic cable onto the detector 304 of the receiver 111. In order to keep the optical fibers 101 in alignment with the optical block 402, a pair of fiber ferrules 422 are provided. The fiber ferrules 422 are inserted into the optical ports 417A and 417B.

Figure 6D:
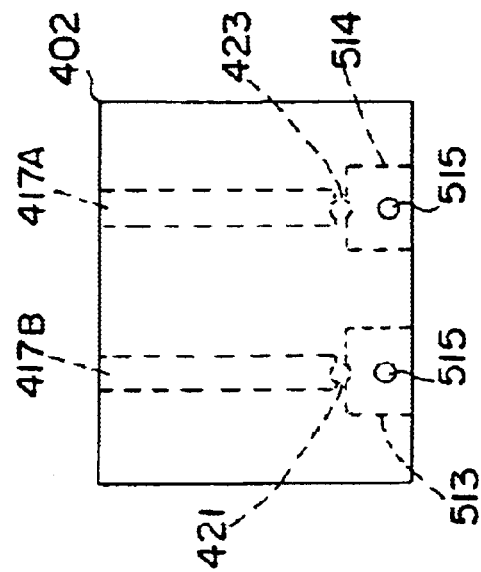
FIG. 6D is a top side view of the optic block for the second embodiment of the present invention.
Figure 6B:
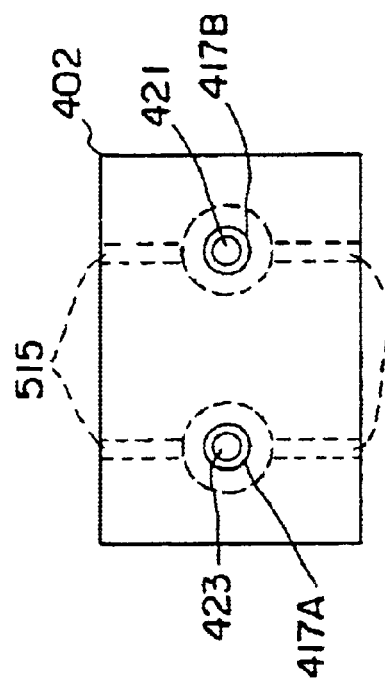
FIG. 6B is a front side view of the optic block for the second embodiment of the present invention.
Figure 6C:
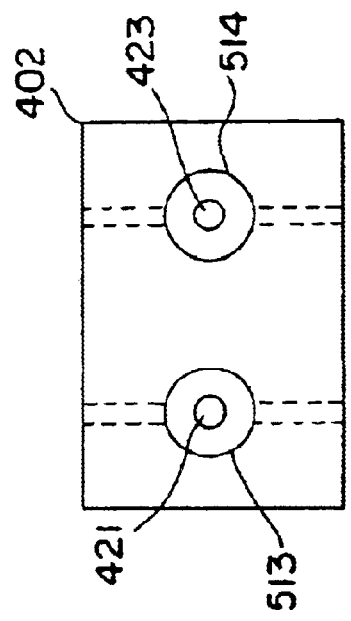
FIG. 6C is a back side view of the optic block for the second embodiment of the present invention.

FIG. 6B illustrates the front side of the optical block 402. The front side of the optical block 402 includes optical output ports 417A and 417B. In FIG. 6B, the lens 421 is visible through the optical output port 417B and lens 423 is visible through the optical output port 417A. FIG. 6C is an illustration of the back side of the optical block 402. In FIG. 6C, the lens 421 is visible through opening 513 and lens 423 is visible through opening 514. FIG. 6D illustrates the top side of the optical block 402 which has the tacking holes 515 coupling to the openings 513 and 514. Epoxy may be inserted into the top and bottom tacking holes 515 to hold the transmitter 110 and receiver 111 in position in the optical block 402.

Figure 7A:
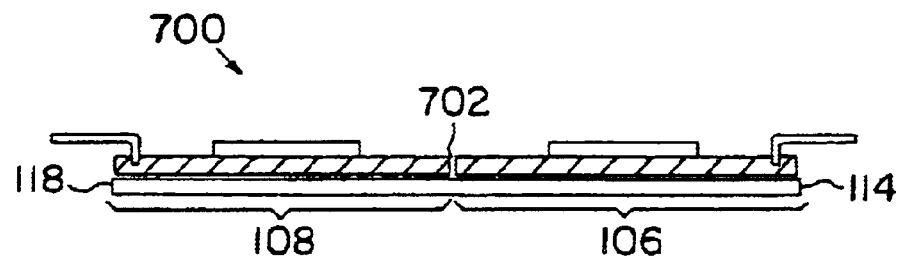
FIG. 7A is a top view of a manufacturing step of the present invention.
Figure 7B:
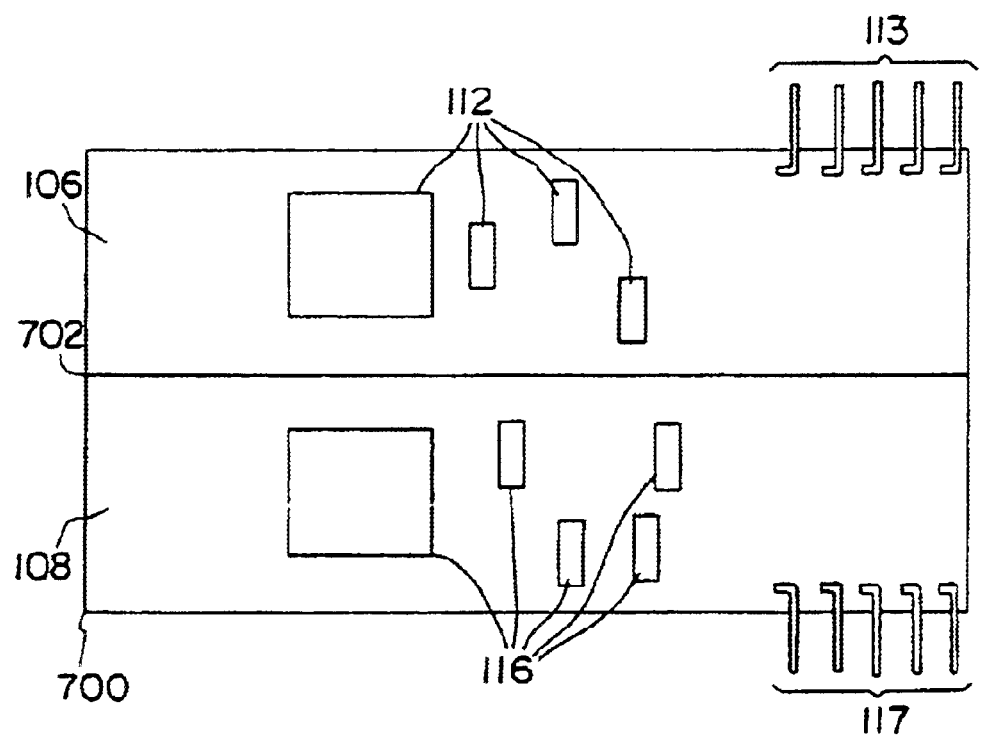
FIG. 7B is a side view of a manufacturing step of the present invention.

Referring now to FIGS. 7A–7B, final steps of the assembly of printed circuit boards 106 and 108 are illustrated. Transmit PCB 106 and receive PCB 108 are assembled as one unit on one printed circuit board 700 with a center score 702 defining a boundary line between transmit and receive components. After all components have been attached and assembled onto the unitary PCB 700, the PCB 700 is flexed along the score 702 such that the transmit PCB 106 and the receive PCB 108 may be separated. Transmit PCB 106 and the receive PCB 108 may thereafter be assembled as part of the fiber optic module 100 and the fiber optic module 400. The transmit PCB 106 and the receive PCB 108 may each be approximately 6.5 mm in height excluding pins 113 and 117.

The previous detailed description describes fiber optic modules as including a receiver and transmitter. However, one of ordinary skill can see that a fiber optic module may be a receiver only or a transmitter only such that only one board may be substantially perpendicular to the base. Additionally, the previous detailed description described one PCB board for receive and transmit functions. However, the present invention may be extended to a plurality of PCB boards substantially in parallel for providing transmit or receive functionality or both into parallel fiber optic cables.

As those of ordinary skill will recognize, the present invention has many advantages over the prior art. One advantage of the present invention is that the shielded housing provides one EMI shield for a fiber optic transceiver instead of two separated EMI shields that are ordinarily required. Another advantage of the present invention is that vertical PCBs provide a narrower width of fiber optic module to provide a coupling to narrower optical fiber connectors. Another advantage of the present invention is that ground planes of the vertical PCBs reduce cross talk. Another advantage of the present invention is that the physical separation of the receive and transmit optical elements and electrical elements provides superior isolation and minimizes optical and electrical cross-talk.

The preferred embodiments of the present invention for METHOD AND APPARATUS FOR VERTICAL BOARD CONSTRUCTION OF FIBER OPTIC TRANSMITTERS, RECEIVERS AND TRANSCEIVERS are thus described. While the present invention has been described in particular embodiments, the present invention should not be construed as limited by such embodiments, but rather construed according to the claims that follow below.

What is claimed is:

1. A fiber optic module comprising:
   a first optoelectronic device to couple photons into or receive photons out of a first optical fiber;
   a first printed circuit board coupled to the first optoelectronic device parallel to an optical axis of the first optoelectronic device, the first printed circuit board having one or more pins;
   a shielded housing spaced around the first printed circuit board, the shielded housing to reduce electromagnetic interference (EMI); and
   a base coupled to the shielded housing, the base extending along a length of and perpendicular to the first printed circuit board, the base having an opening for the one or more pins of the first printed circuit board to extend through;
   wherein the fiber optic module mounts to a system printed circuit board such that the first printed circuit board is perpendicular to the system printed circuit board and the optical axis of the first optoelectronic device is parallel to the system printed circuit board.

2. The fiber optic module of claim 1 wherein,
   the first optoelectronic device has a first terminal electrically coupled to one side of the first printed circuit board and a second terminal electrically coupled to an opposite side of the first printed circuit board.

3. The fiber optic module of claim 1 wherein,
   the first printed circuit board is a vertical printed circuit board perpendicular to a horizontal plane and the optical axis of the first optoelectronic device is parallel to the horizontal plane.

4. The fiber optic module of claim 1, wherein the one or more pins of the first printed circuit board couple to the system printed circuit board.

5. The fiber optic module of claim 1, wherein the one or more pins of the first printed circuit board couple to a connector of the system printed circuit board.

6. The fiber optic module of claim 1 further comprising:
   a first lens to focus photons between the first optoelectronic device and the optical fiber.

7. The fiber optic module of claim 1 wherein:
   the shielded housing is electrically coupled to ground.

8. The fiber optic module of claim 7 wherein:
   the shielded housing electrically couples to ground by coupling to a system chassis.

9. The fiber optic module of claim 7 wherein:
   the shielded housing electrically couples to ground through a trace on the first printed circuit board which is coupled to one of the one or more pins of the first printed circuit board.

10. The fiber optic module of claim 1 wherein,
    the shielded housing includes the base as a portion thereof.

11. The fiber optic module of claim 1 wherein,
    the base has a plurality of openings from which the pins of the first printed board extend.

12. The fiber optic module of claim 1 further comprising:
    a nose to receive an optical fiber connector and hold an optical fiber substantially fixed and aligned with the optical axis of the first optoelectronic device.

13. The fiber optic module of claim 12 wherein,
    the nose provides shielding to reduce electromagnetic interference (EMI).

14. The fiber optic module of claim 1 further comprising:
    a second optoelectronic device to receive photons out of or couple photons into a second optical fiber;
    a second printed circuit board parallel to the first printed circuit board, the second printed circuit board coupled to the second optoelectronic device parallel to an optical axis of the second optoelectronic device, the second printed circuit board having a second plurality of pins; and wherein,
    the shielded housing is spaced around the first and second printed circuit boards to reduce electromagnetic interference (EMI).

15. The fiber optic module of claim 14 wherein,
    the second optoelectronic device has a first terminal coupled to one side of the second printed circuit board and a second terminal coupled to an opposite side of the second printed circuit board.

16. The fiber optic module of claim 14 wherein,
    the shielded housing includes the base as a portion thereof, the base having openings from which the one or more pins of the first printed board extend and the one or more pins of second printed circuit board extend.

17. The fiber optic module of claim 14 wherein,
    the base has openings from which the one or more pins of the first printed board extend and the one or more pins of second printed circuit board extend.

18. The fiber optic module of claim 14 further comprising:
    a nose to receive a first optical fiber connector and hold a first optical fiber substantially fixed and aligned with the optical axis of the first optoelectronic device and to receive a second optical fiber connector and hold a second optical fiber substantially fixed and aligned with the optical axis of the second optoelectronic device.

19. The fiber optic module of claim 18 wherein,
    the nose provides shielding to reduce electromagnetic interference (EMI).

20. The fiber optic module of claim 14 wherein,
    the first printed circuit board and the second printed circuit board are vertical printed circuit boards perpendicular to a horizontal plane.

21. The fiber optic module of claim 14 wherein,
the first printed circuit board and the second printed circuit board are vertical printed circuit boards perpendicular to a system printed circuit board when the fiber optic module is mounted thereto.

22. The fiber optic module of claim 14 further comprising:
an internal shield between the first printed circuit board and the second printed circuit board and parallel therewith
and wherein, the shielded housing is spaced around the first printed circuit board and the second printed circuit board to reduce electromagnetic interference (EMI).

23. The fiber optic module of claim 1 wherein,
the shielded housing is a metal housing.

24. The fiber optic module of claim 1 wherein,
the shielded housing is a metal plated plastic housing.

25. The fiber optic module of claim 14 wherein,
the first optoelectronic device is a photodetector to receive photons out of the first optical fiber,
the second optoelectronic device is an emitter to couple photons into the second optical fiber, and
the fiber optic module is a fiber optic transceiver module.

* * * * *